(12) United States Patent
Duchatelle et al.

(10) Patent No.: US 11,773,740 B2
(45) Date of Patent: Oct. 3, 2023

(54) PLATFORM FOR A FAN ROTOR OF AN AIRCRAFT TURBOMACHINE

(71) Applicant: SAFRAN AIRCRAFT ENGINES, Paris (FR)

(72) Inventors: Thierry Francois Maurice Duchatelle, Moissy-Cramayel (FR); Yann Andre Maurice Perrin, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/997,268

(22) PCT Filed: Apr. 23, 2021

(86) PCT No.: PCT/FR2021/050716
§ 371 (c)(1),
(2) Date: Oct. 27, 2022

(87) PCT Pub. No.: WO2021/224561
PCT Pub. Date: Nov. 11, 2021

(65) Prior Publication Data
US 2023/0220782 A1      Jul. 13, 2023

(30) Foreign Application Priority Data
May 4, 2020 (FR) .................................. 2004399

(51) Int. Cl.
| | |
|---|---|
| *F01D 11/00* | (2006.01) |
| *F01D 5/02* | (2006.01) |
| *F01D 5/14* | (2006.01) |

(52) U.S. Cl.
CPC ............ *F01D 11/008* (2013.01); *F01D 5/021* (2013.01); *F01D 5/147* (2013.01);
(Continued)

(58) Field of Classification Search
CPC ............ F01D 11/008; F05D 2250/283; F05D 2260/963
See application file for complete search history.

(56) References Cited

U.S. PATENT DOCUMENTS

| | | |
|---|---|---|
| 5,281,096 A | 1/1994 | Harris et al. |
| 2008/0226458 A1 | 9/2008 | Pierrot et al. |

(Continued)

FOREIGN PATENT DOCUMENTS

| | | |
|---|---|---|
| EP | 1970537 A1 | 9/2008 |
| EP | 3482050 A1 | 5/2019 |

(Continued)

OTHER PUBLICATIONS

International Search Report received for PCT Patent Application No. PCT/FR2021/050716, dated Sep. 24, 2021, 9 pages (4 pages of English Translation and 5 pages of Original Document).

*Primary Examiner* — Christopher R Legendre
(74) *Attorney, Agent, or Firm* — WOMBLE BOND DICKINSON (US) LLP

(57) ABSTRACT

Platform for an aircraft turbo machine fan rotor, the platform being configured to be secured to a fan disc between two adjacent fan blades. The platform further including a longitudinal wall defining an aerodynamic external face. The wall includes a honeycomb structure interposed between two skins which are respectively an internal skin and an external skin, with the external skin defining the aerodynamic external face.

10 Claims, 4 Drawing Sheets

(52) U.S. Cl.
CPC .... *F05D 2220/36* (2013.01); *F05D 2250/283* (2013.01); *F05D 2260/963* (2013.01)

(56) References Cited

U.S. PATENT DOCUMENTS

| | | |
|---|---|---|
| 2018/0010462 A1 | 1/2018 | Guivarc'h et al. |
| 2019/0112934 A1 | 4/2019 | Heeter et al. |
| 2019/0112943 A1 | 4/2019 | Davis, III et al. |
| 2019/0277145 A1 | 9/2019 | Theertham et al. |
| 2020/0248570 A1 | 8/2020 | Lyders et al. |
| 2020/0355082 A1 | 11/2020 | Theertham |

FOREIGN PATENT DOCUMENTS

| | | |
|---|---|---|
| EP | 3536909 A1 | 9/2019 |
| EP | 3693548 A1 | 8/2020 |
| EP | 3736412 A1 | 11/2020 |
| WO | 2017/006054 A1 | 1/2017 |
| WO | 2018/007717 A1 | 1/2018 |

[Fig.1]
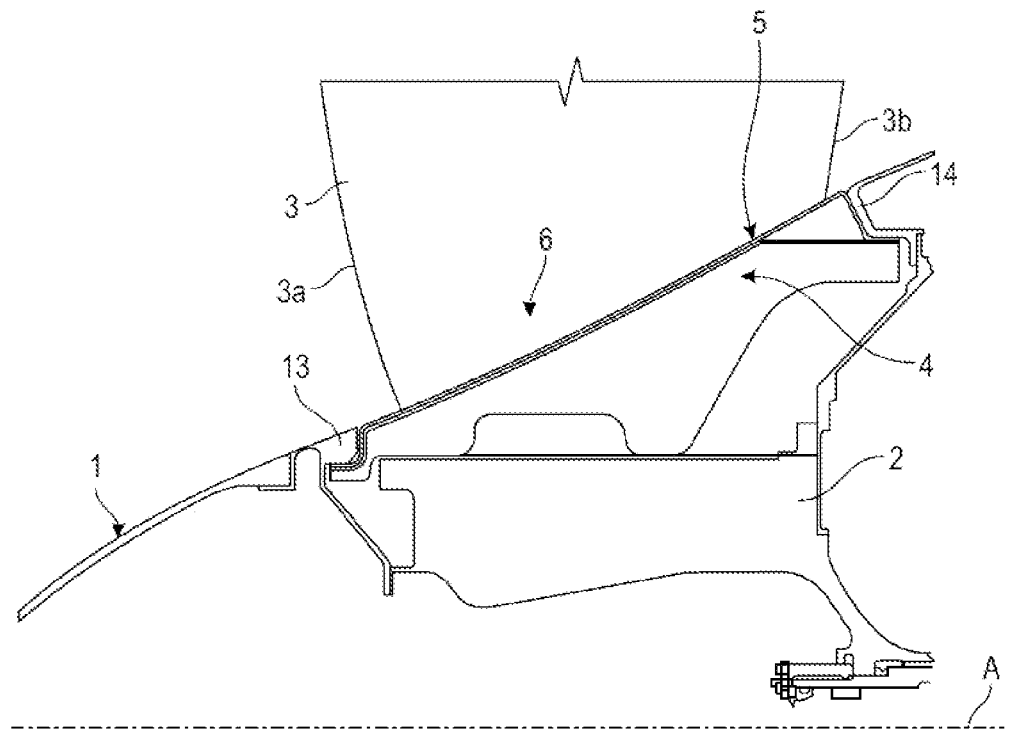
[Fig.2]
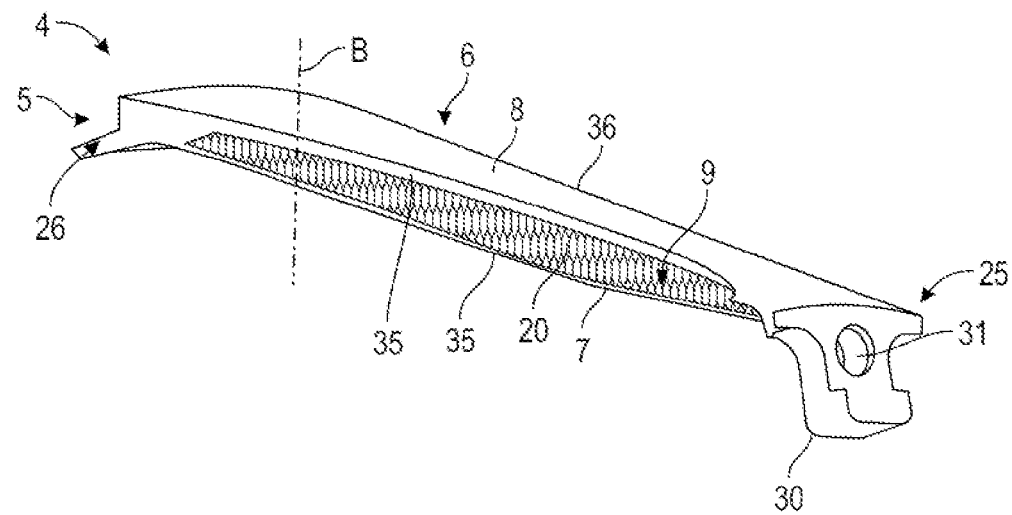

[Fig.3]
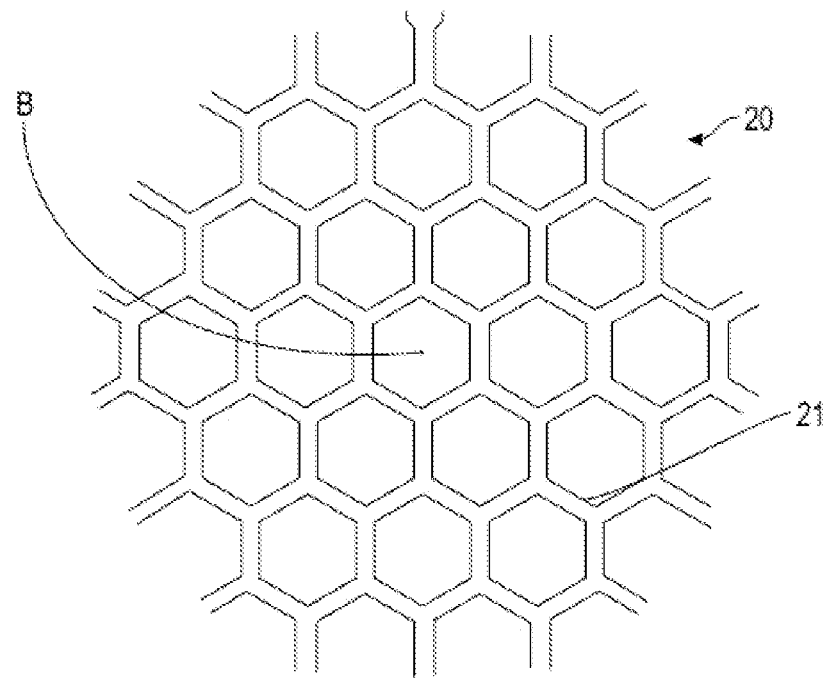
[Fig.4]
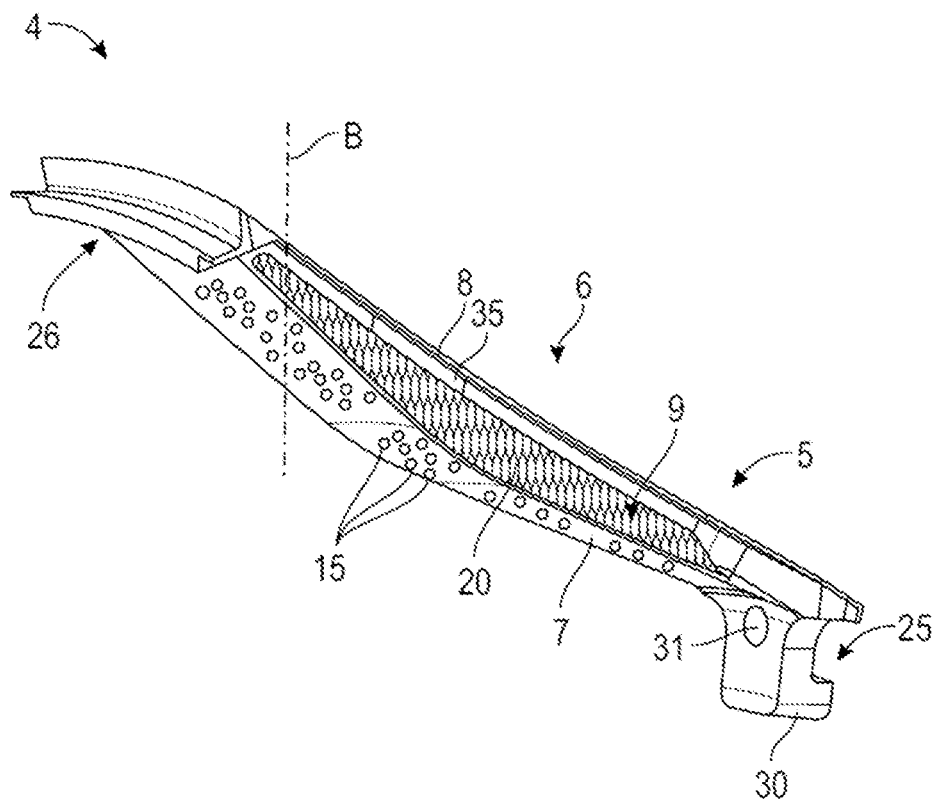

[Fig.5]
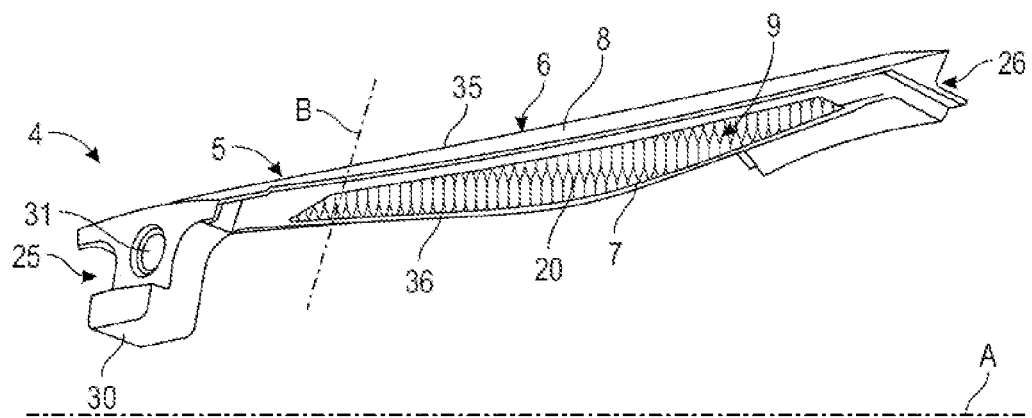
[Fig.6]
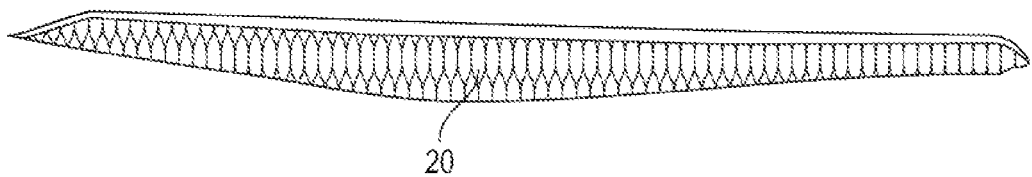

[Fig.7]
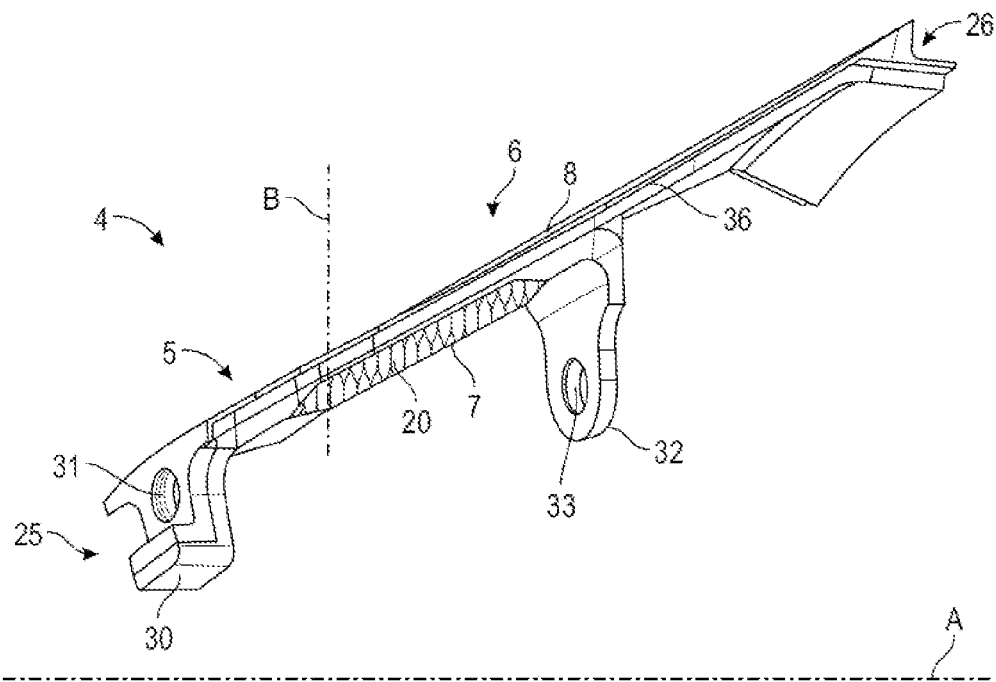
[Fig.8]
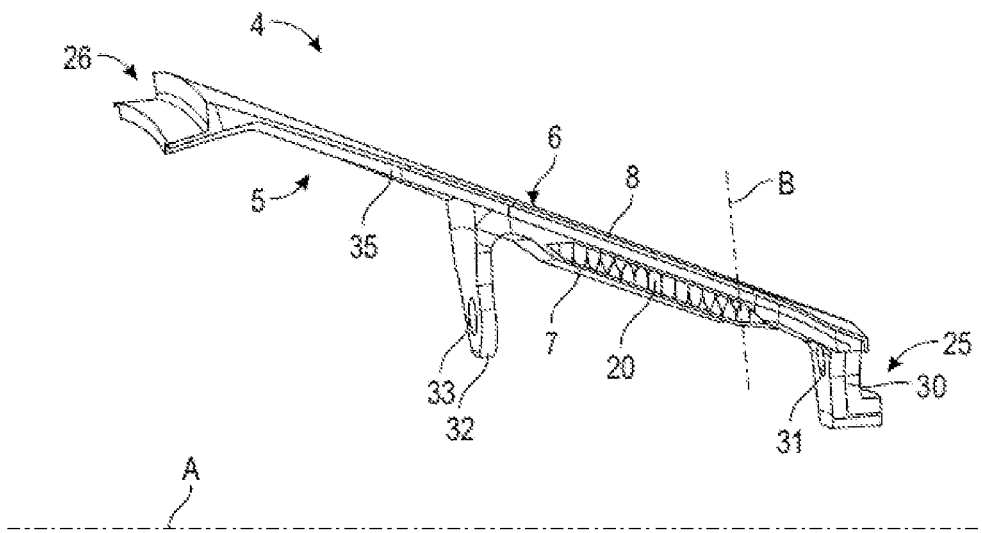

PLATFORM FOR A FAN ROTOR OF AN AIRCRAFT TURBOMACHINE

TECHNICAL SCOPE OF THE INVENTION

The present invention relates to a platform for a fan rotor of an aircraft turbomachine.

TECHNICAL BACKGROUND

The technical background comprises, in particular, the documents EP-A1-3,536,909A1, U.S. Pat. No. 5,281,096, US-A1-2019/0112943, EP-A1-3,482,050 and WO-A1-2018/007717.

It is known from the prior art that a fan rotor has an axis of rotation and comprises a fan disk and fan vanes or blades comprising root fitted into cells in the periphery of the disk. Each vane comprises a pressure side, a suction side, a leading edge and a trailing edge.

The fan rotor further comprises platforms interposed between the fan blades and attached to the periphery of the disk. Each platform comprises an aerodynamic external face extending along said axis substantially from the leading edges to the trailing edges of the vanes between which that platform is mounted. Such a fan rotor is known in particular from the document EP-A1-1 970 537.

From an aerodynamic point of view, the primary function of each platform is to define the air inlet duct into the turbomachine. In addition, the platforms must also be able to withstand high loads without deforming and remaining secured to the disk that carries them.

In addition, each platform must meet all operating conditions, i.e., ensure the performance for the entire operating envelope, e.g. for aircraft flight, guarantee safety requirements and ensure availability of the rotor as part of the engine for commercial use.

With regard to safety, each platform must be capable of absorbing a significant amount of energy by crushing its lateral edges along a pressure side of a vane and a suction side of an adjacent vane respectively.

In order to satisfy these different requirements, certain configurations have been proposed in which the platforms each have a wall comprising a first part which defines the air inlet duct and ensures the retention of the platform when the engine is rotating, and a second part located on the side of the disk and which allows to limit the deformations of the first part under the effects of the centrifugal forces and to maintain the platform in position when the engine is stopped.

Furthermore, on the new engines, the search for performance pushes to lower the hub ratio to gain aerodynamic section, as described in the publication WO-A1-2017/006054. This leads to imposing an increasingly smaller gap between the duct and the disk and thus an increasingly smaller wall thickness.

As a result, the platform finds itself having to combine a need for stiffness in order to flex as little as possible under centrifugal force, and a need for limited space which prevents the integration of an excessively bulky wall (or box) which could provide the desired level of stiffness.

In particular, the present invention is intended to solve some or all of the above problems.

SUMMARY OF THE INVENTION

The invention proposes a platform for a fan rotor of an aircraft turbomachine, this platform being configured to be secured to a fan disk between two adjacent fan blades, the platform comprising a longitudinal wall defining an aerodynamic external face, said wall comprising a honeycomb structure interposed between two skins made of a composite material, respectively internal and external, the external skin defining said aerodynamic external face.

According to the invention, the external skin comprises a three-dimensional woven structure and the internal skin comprises a stratified structure.

With the honeycomb architecture of the invention, the density of the platform is reduced compared to a full platform of the prior art while maintaining good rigidity so as to better resist the centrifugal force.

Indeed, when the thickness of the honeycomb structure and therefore of the wall is increased, the gain in the squared moment of the wall is made per cube without any significant increase in mass, i.e., without leading to an increase in the centrifugal force. The increase in thickness thus allows a gain in deflection per cube of the thickness. In contrast, in a full architecture of the prior art, an increase in thickness still allows a gain in the wall squared moment per cube but also leads to an increase in the centrifugal force. In the latter case, the increase in thickness only results in a gain in the deflection squared by the thickness.

Adjusting the thickness of the wall of the platform of the invention thus allows the centrifugal force resistance of the platform to be increased and/or the space of the platform to be reduced.

The external skin comprises a three-dimensional woven structure, which allows to give it increased resistance, in particular to the impacts. Its resistance to the impacts is due in particular to its ability not to delaminate.

The internal skin has a stratified structure, which increases its mechanical stiffness, particularly in order to limit its deformation. The stratified structure gives almost total freedom to adjust the stiffness by adjusting the directions and the number of superimposed layers.

Both the internal and external skins can be fibre-based.
The structures of the skins are thus adapted to improve the mechanical strength of the platform in operation.

The platform according to the invention may comprise one or more of the following features, taken alone with each other or in combination with each other:
  the external skin has a thickness greater than that of the internal skin;
  the external skin comprises orifices opening into said cells so as to provide the platform with an acoustic function;
  the honeycomb structure comprises cells which extend substantially perpendicular to at least the external skin;
  the internal skin includes orifices opening into said cells so as to give the platform an acoustic function;
  the honeycomb structure has a thickness that varies between longitudinal ends of the wall and/or between lateral ends of the wall;
  the platform comprises at least one fixing bracket for attachment to the fan disk, this fixing bracket comprising an orifice for the passage of a screw; this fixing bracket is for example located at a longitudinal end located on the upstream side of the platform and of the disk and/or for example substantially halfway between the upstream and downstream ends of the platform and of the disk;
  the honeycomb structure extends over only part of the longitudinal dimension of the wall;
  the honeycomb structure extends over substantially the entire longitudinal dimension of the wall;

the honeycomb structure extends between two fixing brackets;

one fixing bracket is located at a longitudinal end of the wall;

one fixing bracket is located substantially in the middle of the wall; and the external skin has a thickness of between 2 and 20 mm, more preferably between 5 and 10 mm, and the internal skin has a thickness of between 0.5 and 5 mm, more preferably between 1 and 3 mm.

The invention also relates to an aircraft turbomachine, comprising a fan rotor comprising a fan disk carrying vanes, with platforms as described above interposed between said vanes.

BRIEF DESCRIPTIONS OF THE FIGURES

The invention will be better understood and other details, features and advantages of the invention will become clearer from the following description made by way of non-limiting example and with reference to the attached drawings in which:

FIG. 1 is a schematic axial cross-sectional view of a fan rotor;

FIG. 2 is a perspective view of a platform according to the invention;

FIG. 3 is a schematic view of a honeycomb structure of the platform according to a cross-sectional plane substantially parallel to a longitudinal extension of the platform of FIG. 2;

FIG. 4 is a perspective view of the platform of FIG. 2 according to an alternative embodiment;

FIG. 5 is a perspective view of the platform of FIG. 4 from a different viewing angle;

FIG. 6 is an axial cross-sectional view of a honeycomb structure of the platform of FIG. 4;

FIG. 7 is a perspective view of the platform of FIG. 2 in an alternative embodiment; and FIG. 8 is a perspective view of the platform of FIG. 7 from a different viewing angle.

DETAILED DESCRIPTION OF THE INVENTION

Reference is first made to FIG. 1 which shows a partial axial cross-sectional view of a fan rotor 1 of an aircraft turbomachine. The rotor 1 has a longitudinal axis of rotation A and comprises a fan disk 2 and fan blades 3 or vanes comprising as a retention device of the root fitted into cells in the periphery of the disk 2. Each blade 3 comprises a pressure side, a suction side, a leading edge 3a and a trailing edge 3b.

The rotor 1 also comprises an upstream shroud 13 and a downstream shroud 14, both shrouds 13, 14 being secured to the fan disk 2.

The fan rotor 1 comprises platforms 4 configured to be secured to the fan disk 2 between two adjacent fan vanes 3. The platforms 4 are interposed between the fan vanes 3 and fixed or held radially to the periphery of the disk 2. Each platform 4 comprises an aerodynamic external face 6 extending along said axis A substantially from the leading edges 3a to the trailing edges 3b of the vanes 3 between which that platform 4 is mounted. The platform 4 comprises a longitudinal wall 5 defining the aerodynamic external face 6. FIG. 1 shows a fan rotor 1 of an aircraft turbomachine, the platforms of which are such that the invention aims to improve in particular to better deal with centrifugal forces and even more particularly concerning the longitudinal wall and the stability in service of its external face 6.

As illustrated in FIG. 2, the wall 5 comprises a first longitudinal end 25, located on the upstream side of the platform 4, i.e., intended to be located on the side of the leading edge of the vanes, and a second longitudinal end 26 located on the downstream side of the platform 4, i.e., intended to be located on the side of the trailing edges of the vanes. These longitudinal ends 25, 26 are intended to cooperate with the shrouds of the fan rotor. At the longitudinal end 25 on the upstream side, a centrifugal support takes place with the corresponding upstream shroud 13. At the longitudinal end 26 on the downstream side, a centrifugal support intervenes with the corresponding downstream shroud 14. These radial supports can also be associated with longitudinally inclined supports.

The wall 5 also comprises two lateral edges or lateral ends 35, 36, of which a first lateral edge 35 is intended to be located on the side of a pressure side of the blades and a second lateral edge 36 is intended to be located on the side of a suction side of the blades.

The platform 4 further comprises at least a first fixing bracket 30 for attachment to the fan disk. The first fixing bracket 30 comprises, in particular, an orifice 31 for the passage of a screw for attachment to the disk. The first fixing bracket 30 is, for example, located at one of the longitudinal ends 25, 26 of the wall 5 and in particular the first longitudinal end 25. Alternatively, the first fixing bracket 30 is located substantially in the middle of the wall 5, substantially midway between its upstream and downstream ends.

The wall 5 comprises a honeycomb structure 20. The wall 5 also comprises two skins 7, 8, respectively the internal skin 7 and the external skin 8, the external skin 8 defining the aerodynamic external face 6. The two skins 7, 8 extend substantially in parallel.

The honeycomb structure 20 is located between the two skins 7, 8, in particular in a cavity 9 delimited by the two skins 7, 8. Thus, the invention proposes to produce a sandwich structure in which the two skins 7, 8 come to sandwich the honeycomb structure 20. The honeycomb structure 20 extends in particular over substantially the entire longitudinal dimension of the wall 5.

The skins 7, 8 are for example made of composite material. They can be adjusted to best fulfil the functions of the platform 4.

For example, the skins 7, 8 may each comprise a stratified or woven structure.

The external skin 8 comprises a three-dimensional woven structure. The external skin 8 is then particularly strong, in particular with the aim of withstanding a direct bird strike well.

The internal skin 7 comprises a stratified structure. The internal skin 7 thus has a higher mechanical stiffness, in particular in order to limit the deformations of the external skin 8, and it will therefore be possible to use a thinner and therefore lighter internal skin 7.

In particular, by making the internal skin 7 with a structure other than a three-dimensional woven structure, the invention allows in particular to reduce the number of three-dimensional woven preforms to be made and thus to simplify the manufacturing process of the platform 4.

The thickness of the external skin 8 is, for example, greater than that of the internal skin 7, as it must in particular absorb the potential impacts from the external environment. The external skin 8 preferably has a thickness of between 2 and 20 mm, and more preferably between 5 and 10 mm. The internal skin 7 is preferably between 0.5 and 5 mm thick, and more preferably between 1 and 3 mm.

The honeycomb structure 20, as illustrated in FIG. 3, comprises cells 21 which extend substantially perpendicular to at least the external skin 8 and possibly also to the internal skin 7. It is understood here that the cells 21 extend along an axis B, transverse to the axis A and in particular substantially parallel to the vanes. The honeycomb structure 20, due to its high mechanical properties in terms of crushing, can dampen and absorb significant forces, in particular in the event of loss of vane.

As illustrated in FIG. 4, the presence of the honeycomb structure 20 between the internal skin 7 and the external skin 8 allows for example to integrate an acoustic treatment function. One of the skins, and for example the internal skin 7, includes in particular for this purpose orifices 15 each opening into a distinct cell of the honeycomb structure 20 so as to create a plurality of Helmholtz resonators.

Indeed, a Helmholtz resonator is an acoustic system comprising a small opening or "resonator neck" (in this case an orifice 15), connected to a large volume or "resonator bottle" forming a resonant cavity (in this case a cell). Parameters of the cells and orifices, such as their shape and size, are then configured so that the platform 4, thanks to its Helmholtz resonator function, is able to absorb noise in a given frequency range, for example so as to limit the noise of the turbomachine.

Alternatively, the cavity 9 may be filled with foam to prevent moisture from being stored inside the cavity 9.

Alternatively, it is possible to provide such resonators with an external skin orifice 8, filled with foam to avoid aerodynamic discomfort.

As illustrated in FIGS. 4 and 5 or in more detail in FIG. 6, the honeycomb structure 20 has for example a thickness that varies between the longitudinal ends 25, 26 of the wall 5. According to an alternative embodiment of the invention not shown, the honeycomb structure 20 may also additionally or alternatively comprise a thickness that varies between the lateral edges 35, 36 of the wall 5.

These configurations in which the thickness of the honeycomb structure 20 varies, allow to obtain an arch shape, to have the maximum squared moment at the necessary place in order to notably better resist the centrifugal force and to have lesser heights under duct (i.e., lesser wall thickness 5) at the necessary places. With this technique, the thickness of the honeycomb structure 20 is adjusted according to the need for stiffness, which will vary mainly according to the length of the platform 4 (depending directly on the chord of the vane, i.e., the outer line from the leading edge to the trailing edge of the vane), the rotational speed of the rotor and the position of the centre of gravity of the platform 4. The invention thus allows to obtain stiffness in the longitudinal direction of the platform 4, in particular for the purpose of resisting the centrifugal force, while maintaining, for example, upstream, i.e., on the side of the first end 25, the lowest possible height under duct.

As illustrated in FIGS. 7 and 8, the platform 4 may also comprise a second fixing bracket 32, in particular to dampen and absorb the impacts of the centrifugal force. In particular, it comprises an orifice 33 for the passage of a screw.

The second fixing bracket 32 is in particular located substantially in the middle of the wall 5. Alternatively, the second fixing bracket 32 may be located at one of the longitudinal ends 25, 26 of the wall 5, in particular the first end 25, when the first fixing bracket 30 is located in the middle of the wall 5.

In this example embodiment of the invention, the honeycomb structure 20 extends over only part of the longitudinal dimension of the wall 5, for example between the two fixing brackets 30, 32. The thickness of the platform 4 can in this case be reduced only to the thickness of the skins 7, 8 in the downstream part of the platform 4, i.e., here between the second fixing bracket 32 and the second longitudinal end 26.

The second fixing bracket 32 and/or the reduced length of the honeycomb structure may of course be present in other embodiments of the invention.

The invention claimed is:

1. A platform for a fan rotor of an aircraft turbomachine, said platform being configured to be secured to a fan disk between two adjacent fan vanes, the platform comprising a longitudinal wall defining an aerodynamic external face, said wall comprising a honeycomb structure interposed between two skins made of composite material, respectively internal and external, the external skin defining said aerodynamic external face, wherein the external skin comprises a three-dimensional woven structure and the internal skin comprises a stratified structure, wherein the external skin has a thickness greater than that of the internal skin.

2. The platform according to claim 1, wherein the external skin comprises orifices opening into cells of the honeycomb structure so as to provide the platform with an acoustic function.

3. The platform according to claim 1, wherein the internal skin comprises orifices opening into cells of the honeycomb structure so as to provide the platform with an acoustic function.

4. The platform according to claim 1, wherein the honeycomb structure comprises cells which extend substantially perpendicular to at least the external skin.

5. The platform according to claim 1, wherein the honeycomb structure has a thickness that varies between longitudinal ends of the wall and/or between lateral ends of the wall.

6. The platform according to claim 1, further comprising at least one fixing bracket for attachment to the fan disk, said each fixing bracket comprising an orifice for passage of a screw.

7. The platform according to claim 1, wherein the honeycomb structure extends over only a part of a longitudinal dimension of the wall.

8. The platform according to claim 1, wherein the external skin has a thickness of between 2 and 20 mm, and the internal skin has a thickness of between 0.5 and 5 mm.

9. The platform according to claim 8, wherein the thickness of the external skin is between 5 and 10 mm and the thickness of the internal skin is between 1 and 3 mm.

10. An aircraft turbomachine, comprising a fan rotor comprising a fan disk carrying vanes, platforms according to claim 1 being interposed between said vanes.

* * * * *